United States Patent [19]
Hertz

[11] 3,916,421
[45] Oct. 28, 1975

[54] LIQUID JET RECORDER

[76] Inventor: Carl Hellmuth Hertz, Skolbanksvagen 8, Lund, Sweden

[22] Filed: June 20, 1974

[21] Appl. No.: 481,122

[30] Foreign Application Priority Data
July 2, 1973 Sweden.............................. 7309262

[52] U.S. Cl. ................................................. 346/75
[51] Int. Cl.². ........................................ G01D 15/18
[58] Field of Search............................ 346/75; 317/3

[56] References Cited
UNITED STATES PATENTS

| | | | |
|---|---|---|---|
| 3,416,153 | 12/1968 | Hertz et al............................. | 346/75 |
| 3,596,275 | 7/1971 | Sweet................................ | 346/75 X |
| 3,737,914 | 6/1973 | Hertz................................... | 346/75 |
| 3,769,627 | 10/1973 | Stone.................................... | 346/75 |

Primary Examiner—Joseph W. Hartary
Attorney, Agent, or Firm—Bessie A. Lepper

[57] ABSTRACT

Ink-jet recorder apparatus including means to form a jet stream of droplets at a drop formation point and electrode means to control the direction of droplet travel. The electrode means are formed of only two electrodes, the first of which is used to place electrical charges, if required, on the droplets and the second of which is used in conjunction with the first electrode to establish and maintain an electric field for controlling the direction of travel and ultimate disposition of the droplets, e.g., on a record receiving member or in a liquid collector for those droplets not directed onto the record receiving member. The apparatus may be operated to carry out two different techniques of ink-jet recording — that of U.S. Pat. No. 3,416,153 and U.S. Pat. No. 3,596,275. The apparatus is suitable for handling a plurality of ink jets to print alphanumerical characters.

40 Claims, 15 Drawing Figures

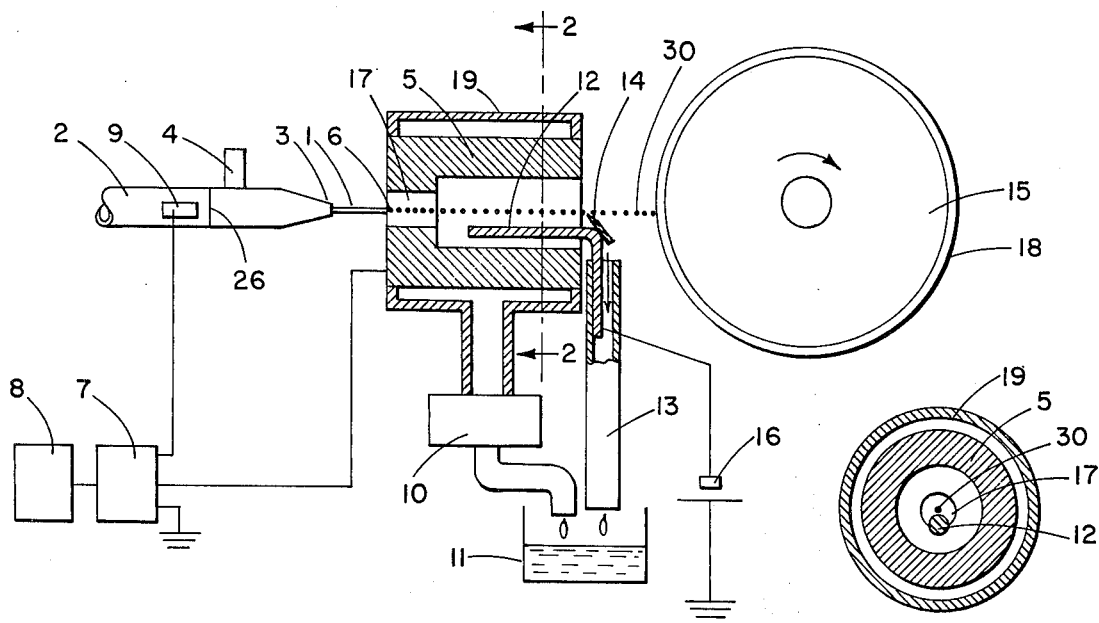
Fig. 1
Fig. 2
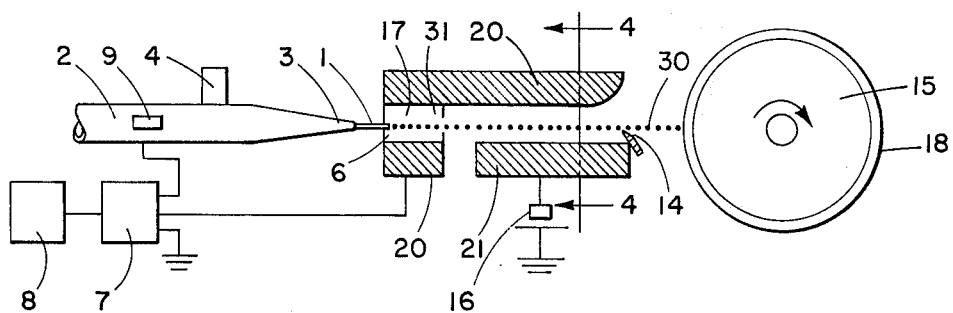
Fig. 3
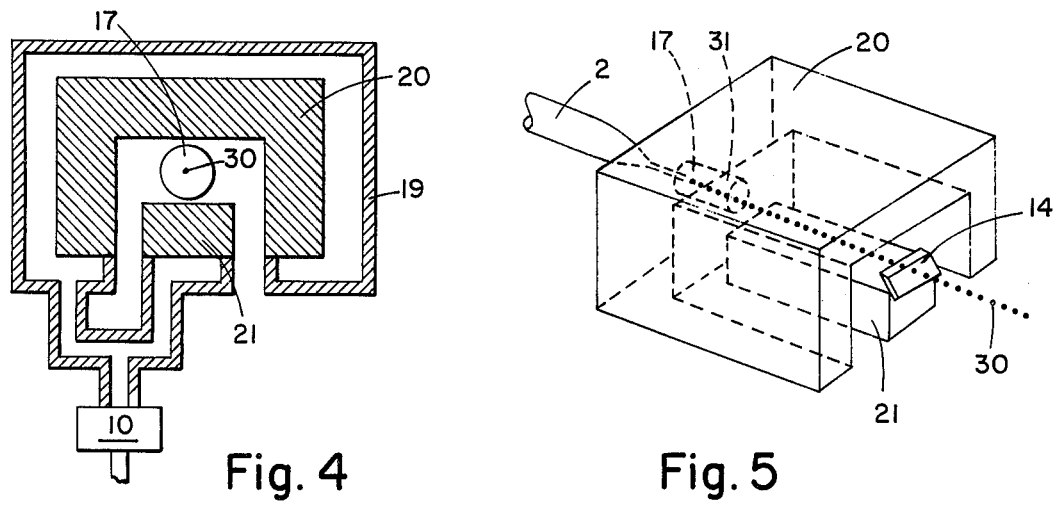
Fig. 4
Fig. 5

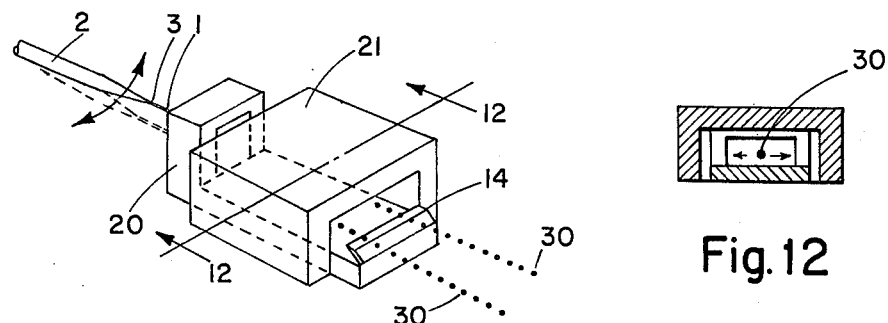
Fig. 11
Fig. 12
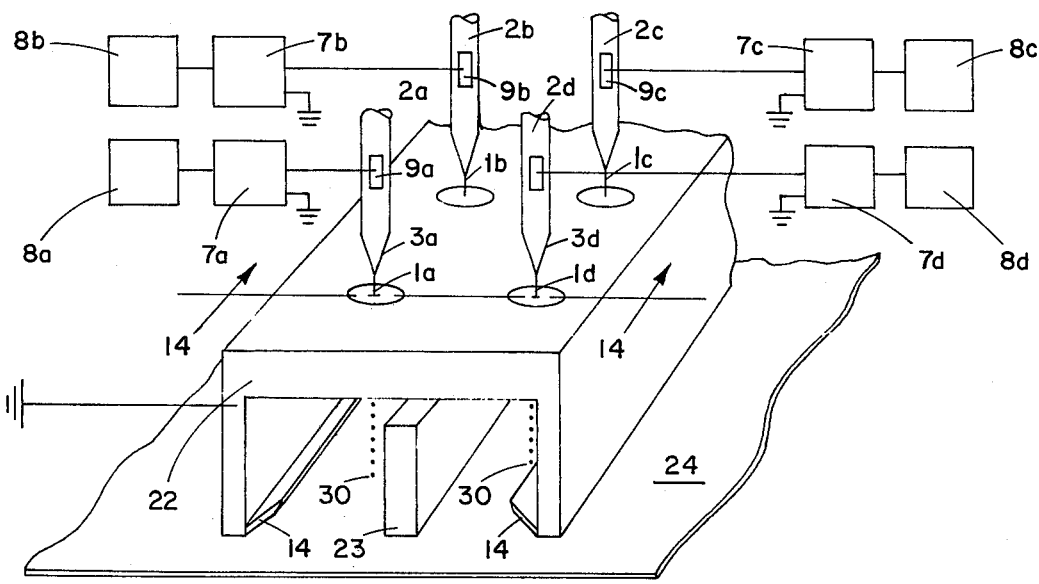
Fig. 13
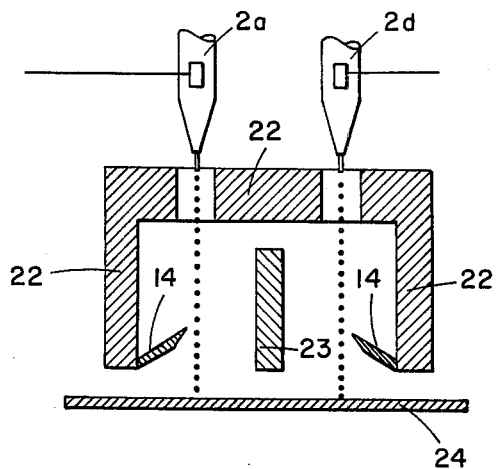
Fig. 14
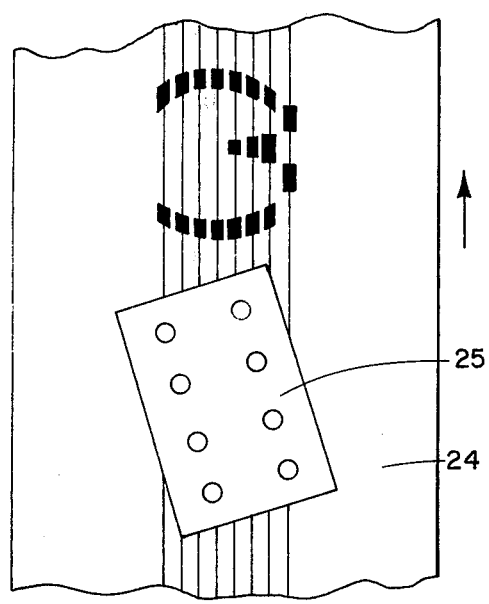
Fig. 15

LIQUID JET RECORDER

This invention relates to ink jet recorders and more particularly to ink jet recorders which include a signal control electrode and droplet directing electrode means.

Great interest has been devoted during the last decade to various ways of utilizing ink jets for different recording purposes. A survey of these methods has been given by Kamphoefner in an article entitled "Ink Jet Printing" in IEEE Transactions on Electron Devices ED-19, April 1972, page 584. It appears from this article that only two fundamentally different methods use a liquid jet produced by the recording liquid being urged under high pressure through a nozzle. The methods are described by Sweet in U.S. Pat. Nos. 3,596,275 and 3,373,437, and by Hertz and Simonsson in U.S. Pat. No. 3,416,153 or Swedish Pat. Nos. 311,537 and 331,370, respectively. While Sweet's method aims at charging the jet electrically and then deflecting it to the desired position on a record receiving paper, Hertz and Simonsson charge the jet so much that it diffuses and forms a spray which is then prevented from reaching the record receiving paper inter alia with the aid of a transverse electric direct voltage field. Both methods have then been further developed and applied in various connections.

A liquid jet which exits under high pressure from a nozzle shortly after its exit spontaneously breaks up at the so-called "drop formation point" into droplets which travel in a straight path towards a record-receiving member. Both in Sweet's method and in the method of Hertz et al., these droplets are charged by electrical influence from a signal control electrode immediately beyond the drop formation point and to which a signal voltage has been connected. In both methods the droplets are then caused to travel through an electric direct voltage field generated between two electrodes at right angles to the direction of the jet. These electrodes form what will hereinafter be referred to as the drop directing electrode means. At this point, however, the two methods differ: Sweet produces droplets of exactly equal volume and determines the charge in each droplet in such a way that it is deflected in the electric field precisely to the position on the record receiving paper where the droplet is to be placed. This, in turn, implies that the Sweet method will be very sensitive to small changes in the drop formation process. In contrast, Hertz and Simonsson utilize the transverse field to draw away all charged droplets so that only the uncharged droplets can reach the record receiving member.

In practice, however, it transpires that the field strength in the transverse fields used must be high in both of these methods in order that the rate of the jet and thus the amount of ink shall be sufficiently large. This involves considerable disadvantages since droplets of the recording liquid readily collect on the insulators which keep the electrodes in position. As a consequence, creeping currents are formed and arcing occurs over these insulators. Such arcing considerably reduces the reliability of the recording systems. This difficulty with arcing is due to the fact that either of the two systems requires at least three electrodes, all of which are under different voltage. Such a situation makes it very difficult to arrange these electrodes in such a way that the insulator parts are protected against ink droplets flying-about.

For this reason, Hertz in Swedish Pat. No. 324,669 has disclosed a considerable simplification of the electrode system. (See also Hertz and Mansson, *The Review of Scientific Instruments* 43:415 (March 1972).) Hertz substitutes for the entire electrode system a single porous tube or a gap, and the charged and diffused droplets of the jet are caught on the inner side of this tube or gap while the uncharged droplets pass the tube along the axis thereof towards the record receiving member. By reason of its simplicity, this electrode system is very reliable in operation but suffers from the drawback that some droplets of the diffused and charged spray pass the tube and give rise to a general background coloration on the record receiving member. In certain cases, this background may be very disturbing, particularly when a plurality of liquid jets are used simultaneously.

It is therefore very essential to provide a total electrode system for controlling a liquid jet, which system combines great freedom from background and simplicity of design with resulting reliability of operation. A principle of the present invention, making it possible to construct such a system, shall be described herein. The invention permits an on-off modulation, free of background, of the record track on the record receiving member in the same way as most of the systems earlier described by Hertz, but use is made of only two electrodes.

It is therefore a primary object of this invention to provide an improved electrode system for ink-jet recorders and ink-jet recorders incorporating the electrode system. It is another object to provide an electrode system of the character described which permits the construction of very compact ink-jet recorders due to the geometrical simplicity of the electrode system, thus in turn making these ink-jet recorders particularly suitable for printing systems embodying a plurality of ink jets.

Still another object of this invention is to provide electrode systems for ink-jet recorders which require lower voltages for the droplet direction electrode means and as a result experience essentially no leakages along insulators on which ink drops have collected. Yet an additional object is to provide ink-jet recorders of the character described which elimante background coloration and which exhibit a high degree of reliability.

Other objects of the invention will in part be obvious and will in part be apparent hereinafter.

In the apparatus of this invention means are provided to gererate a stream of liquid droplets which are then electrically charged by a signal control electrode. The droplets bearing electrical charges are then brought under the influence of an electrical field established by a droplet directing electrode means. In the apparatus of this invention, the signal control electrode forms part of the droplet directing electrode means, thus eliminating the use of two separate electrodes for the droplet directing electrode means. This unique electrode system is applicable to carrying out both the Hertz et al. and Sweet processes. Means are also provided for ensuring that stray droplets are caught up and therefore that any undesirable background coloration is eliminated.

In one embodiment of this invention, the apparatus includes the tubular electrode earlier described by Hertz in Swedish Pat. No. 324,669 and in *The Review of Scientific Instruments* article, and it combines this electrode with the high efficiency of the transverse field in suppressing the background. In other embodiments unique electrode configurations are used. To this end, use is made of not more than two electrodes, one of which may lie at ground potential.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which FIG. 1 is a side elevational view partly in cross section of an ink-jet recorder incorporating one embodiment of the electrode system of this invention in which the signal control electrode is of a tubular configuration;

FIG. 2 is a cross section of the electrode system of FIG. 1 taken through plane 2—2 of FIG. 1;

FIG. 3 is a side elevational view partly in cross section and partly diagrammatic illustrating another embodiment of the electrodes are formed in planar configurations;

FIGS. 4 and 5 are cross sectional and perspective views of the electrode system embodiment of FIG. 3;

FIG. 11 is a perspective view of an electrode system constructed in accordance with this invention for use with a laterally oscillating liquid jet;

FIG. 12 is a cross section of the electrode system of FIG. 11 taken through plane 12—12 of FIG. 11;

FIG. 13 is a perspective view of a ink-jet recorder constructed in accordance with this invention having an electrode system for a plurality of liquid jets;

FIG. 14 is cross section of the recorder of FIG. 13 taken through plane 14—14 of FIG. 13; and FIG. 15 illustrates the use of the ink-jet recorder of FIG. 13 in forming record markings.

Figure 6:
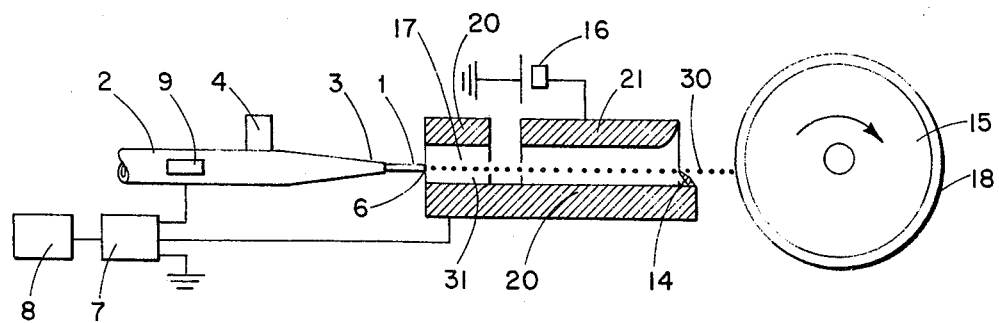
FIG. 6 is a side elevational view partly in cross section and partly diagrammatic illustrating yet another embodiment of the electrode system of this invention in which the electrodes are also formed in planar configurations.

FIG. 1 is a general diagrammatic layout of an ink-jet recorder using the electrode system of this invention. In accordance with known practice a liquid jet 1 with a diameter of 10 to 50 microns exits from an ink supply tube 2 having a nozzle 3 and spontaneously breaks up in the well-known manner into ink droplets at 6. The drop formation process may, if desired, be controlled by means of mechanical oscillations generated by a transmitter 4, e.g., a piezoelectric crystal or magnetostrictive device. This is not, however, necessary for the function of the ink-jet recorder. Its use does, however, result in a decrease in droplet size with simultaneous formation of a larger number of droplets and in the formation of more uniform droplets. The jet 1 of droplets 30 then moves at a rate of about 30 meters per second towards the record receiving medium 18 (e.g., paper) on the platen 15 which may, for example, be spaced a distance of about 25 millimeters from the ink jet nozzle 3 when ink jets having a diameter of about 20 $\mu$m are used. This distance will, of course, vary with the diameter of the ink jet.

Travelling towards the paper, jet 1 passes first through the tubular electrode 5 which is of an electrically conductive porous material. The electrode 5 shields the drop formation point against foreign electrical fields and is used as a signal control electrode for charging the droplets in the same way as has been described by Hertz in Swedish Pat. No. 324,669 or by Sweet in U.S. Pat. No. 3,596,275. For this purpose the electrode 5 is connected to the output amplifier 7 of the signal source 8. The other output from the amplifier 7 is in contact with the recording liquid in the ink supply tube 2 extending through the electrode 9. Normally, one of the outputs of the amplifier 7 is connected to ground. Usually a filter 26 for the ink is inserted between electrode 9 and nozzle 3 in the ink supply tube 2. This filter may be of the so-called microporus type.

Further, the electrode 5 may be surrounded by an electrode housing 19 which is connected to a suction pump 10 so that liquid droplets impinging upon the porous electrode 5 can be sucked away and conveyed to the collecting container 11 when the apparatus is used to carry out the Hertz et al process.

In contrast to the use of an additional tubular electrode for droplet directing described by Hertz in Swedish Pat. No. 324,669, or of two spaced planar electrodes described by Sweet in U.S. Pat. No. 3,569,275, an electrode 12 has been inserted in the new system close to and slightly below the axis of the tubular electrode 5. This electrode 12 may be a metal wire fixed to a collecting tube 13 and carrying a small oblique shutter disc 14 at the end of the electrode nearest rotary platen 15 or it may be of other configurations illustrated in FIGS. 3–12.

This second electrode 12 is connected to a source of voltage 16 which produces a direct voltage of about 1,000 V. This voltage produces an electric field between the electrodes 5 and 12 in which charged liquid droplets are deflected, and thus electrodes 5 and 12 in combination become the droplet directing electrode means. Because of the cylindrical geometry of electrode 5 the field is particularly large adjacent the wire electrode 12 in the embodiment of FIG. 1.

With a signal voltage of zero between the electrodes 5 and 9 the droplets of the liquid jet 1 are not charged, and therefore these droplets pass the electric field between the electrodes 5 and 12 without being actuated. If, however, the signal voltage is increased for example to 200 V the droplets are charged, which results either in the spray phenomenon described in U.S. Pat. No. 3,416,153, or in sufficient deflection of a small group (e.g., four or more) of droplets to cause them to be caught up in the pores of electrode 5 or to be trapped on the under surface of shutter disc 14 serving as a droplet cut-off means. Thus when these droplets bearing a charge pass the electric field between the electrodes 5 and 12 they are attracted to the electrode 12 and prevented from reaching record receiving member 18. A prerequisite is that the deflection voltage of about 1,000 V, applied to the electrode 12, must be of a polarity opposite to the charge on the droplets.

By reason of this attraction, the droplets are deflected and impinge upon the edge or the under side of shutter disc 14. From there they flow through the collecting tube 13 down into the collecting container 11. Therefore, the jet 1 impinges upon the record receiving member 18 only for the time the signal voltage between the recording liquid in the tube 2 and the electrode 5 is very close to zero. This permits an on-off modulation of the intensity of the record track on the record receiving member 18. A prerequisite, however, is that the drop formation point of the jet 1 is shielded from the field between the electrodes 5 and 12. This can be ensured for instance by a restriction of the channel at the entrance to the electrode 5 according to FIG. 1. This restriction should be formed in such a way that a field-free area 17 arises between the drop formation point 6 and the electrode 12.

The basic apparatus of this invention may also be used to carry out the process of Sweet as previously described. In using this apparatus in the Sweet technique, electrode 5 may be formed of a solid metal and electrode housing 19, suction pump 10, collecting tube 13, shutter disc 14 and collecting container 11 are omitted. Modulation of the voltage to signal control electrode 5 is not the on-off regulation as required in the Hertz et al technique but is carried out to deposit on each individual drop a predetermined charge so that that charge on the droplet may be used in connection with the electrical field defined between electrode 5 and 12 to determine the ultimate position of each ink droplet on record receiving member 18.

Since it is of importance for the proper working of the Sweet process that the field intensity of the deflecting field remain constant, it would be necessary in using the apparatus of this invention to practice the Sweet technique to connect the deflecting field generating voltage 16 between the electrodes 5 and 12 in FIG. 1, or between the electrodes 20 and 21 in FIGS. 3–12 described below. This is not necessary when the Hertz process is used since the pure on-off modulation obtained by that process does not make as stringent demands on the continuity of the deflecting electric field.

The prinicple, herein described, of a simple electrode system for modulation of a recording liquid jet can be varied in several ways. Thus, FIGS. 3–12, in which like reference numerals are used to identify the same components, also show electrode systems which comprise but two electrodes and make use of a transverse field to prevent charged droplets from reaching the record receiving member 18. In these embodiments electrode 20, corresponding in function to electrode 5 of FIGS. 1 and 2, and electrode 21, corresponding in function to electrode 12 of those figures, comprise planar configurations, formed of an electrically conductive material which is also preferably of porous construction. As in the case of the embodiment of FIG. 1, an electric field is generated between electrodes 20 and 21 with the aid of the high voltage source 16. The field lies approximately at right angles to the direction of the liquid jet 1 and causes the charged liquid droplets 30 to deflect so that they impinge upon the shutter disc 14. The drop formation point 6 of the jet 1 is shielded from this and other outer fields in the same way as previously described by a suitable configuration of the electrode 20. This is realized in the simplest way by forming an elongated narrow aperture 31 in the step-shaped portion of the electrode 20 so that the field-free area 17 is formed in the aperture.

It may also be pointed out here that the unique electrode configurations of this invention all have the very important property of completely enclosing the path of the drops, or alternatively of the spray, on all sides except for small openings along the axis of the jet. This effectively prevents ink drops, which deviate from the axis of the jet, from reaching other parts of the apparatus, e.g., the insulators supporting the electrodes. This is true for the tubular electrode of FIG. 1 as well as for the electrode configurations shown in FIGS. 3–12 since an electric field is always present between electrodes 20 and 21 and all drops diverging from the axis of the jet stream are always charged. Thus, such diverging drops will not be able to diffuse out of the electrode system without being caught by the electric deflection field. Hence, the systems shown in FIGS. 3–12 are equally effective in confining stray ink drops inside the electrode system as is the system shown in FIG. 1.

The signal voltage from the output amplifier 7 is applied in both cases between the electrode 20 and the recording liquid in the supply tube 2 and one of the amplifier outputs may be connected to the ground. Alternatively, both of the outputs may be connected, each via one output amplifier, to two different signal sources.

Also in the two-electrode systems shown in FIGS. 3–12 the droplets 30 are charged if the signal voltage of the electrode 20 is not close to zero. These droplets are then deflected in the transverse field between the electrodes 20 and 21 and impinge upon the shutter disc 14 which in its most suitable form is an obliquely positioned razor blade. It is, in fact, essential that the edge of the shutter disc 14 be as sharp as possible and that it is of such a material that no droplets can be formed on the edge proper.

Figure 7:
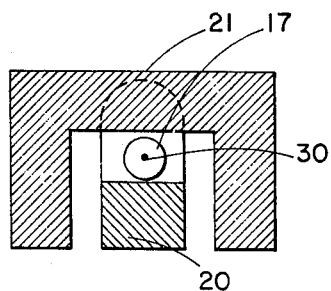
FIGS. 7 and 8 are cross sectional and perspective views of the electrode system embodiment of FIG. 6.
Figure 8:
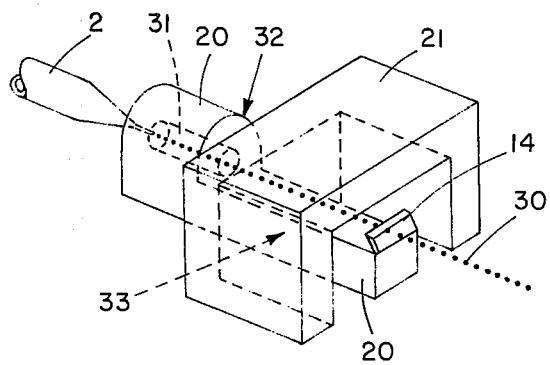

A comparison of the embodiments of FIGS. 3–5 and of FIGS. 6–8 shows that in the embodiment of FIG. 3–5 the signal control electrode 20 is constructed as a four-sided rectangular configuration and electrode 21 is a rectangular member positioned within the cavity defined by electrode 20. In the embodiment of FIGS. 6–8, the signal control electrode 20 is formed to have an enlarged section 32 in which aperture 31 is defined and an extending rectangular section 33 which is surrounded by the three-sided electrode 21.

As will appear from FIGS. 3–5 and 6–8 the position of the shutter disc 14 differs, being in the first case positioned on electrode 21 and in the second case on electrode 20. While this difference in position is fundamentally insignificant and only affects the polarity of the voltage source 16, it plays a certain role in practice since the major part of the recording liquid which does not reach the record receiving paper 18, is collected here. This recording liquid can be carried away by means of a suction pump which is connected to the porous material of the electrodes 20 and 21 and evacuates it in a manner similar to that shown in FIG. 1. Alternatively, the electrodes may be so formed and positioned so that the liquid flows away by gravity.

Figure 9:
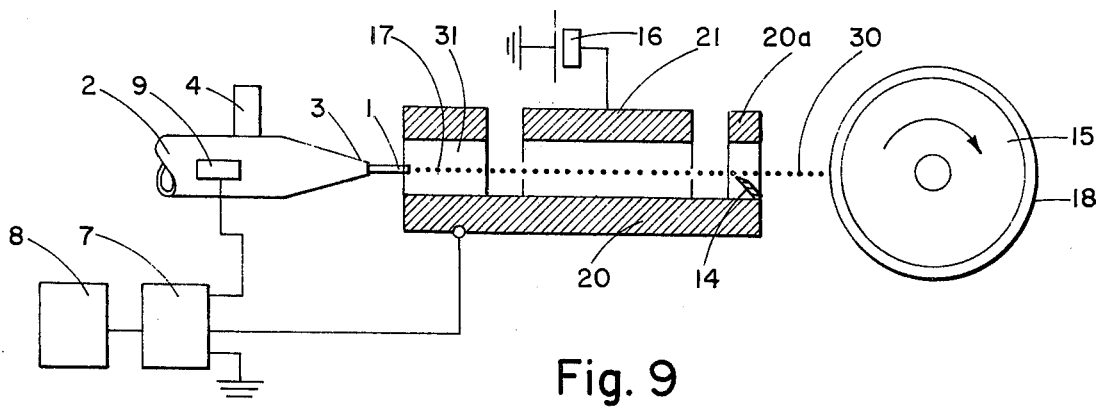
FIG. 9 is a side elevational view partly in cross section and partly diagrammatic illustrating a modification of the electrode system embodiment of FIG. 6.
Figure 10:
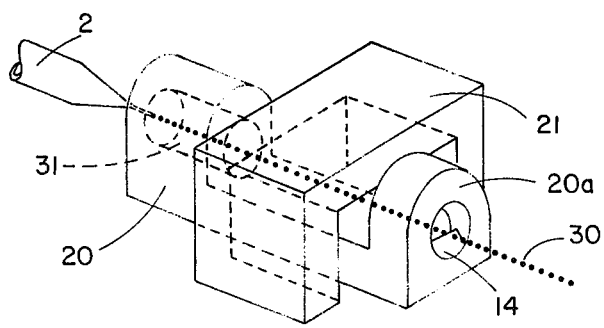
FIG. 10 is a perspective view of the electrode system of FIG. 9.

The configuration shown in side and perspective views in FIGS. 9 and 10 is practically the same as that of FIGS. 6–8. However, the electrode 20 is formed in such a way that it shields the high tension electrode 21 from the drum 18 by an electrically conductive and normally porous wall 20a. This configuration has been found to be advantageous in such applications where dust is present in the atmosphere surrounding the electrode structure, since dust particles are attracted to the electrode 21 where they induce the formation of ink drops. In the electrode system shown in FIGS. 6–8 these drops have a tendency to be attracted by the drum 15 where they give rise to splashes. This can be avoided by the structure shown in FIGS. 9 and 10.

It is, of course, within the scope of this invention to use the apparatus of FIGS. 3–10 in the process of Sweet as described above in conjunction with the discussion of FIG. 1.

FIGS. 11 and 12 are perspective and cross sectional views of a modification of the electrode system illustrated in FIGS. 6–8. It will be seen from FIGS. 11 and 12 that the electrode system of this invention can be designed in such a way as to practically entirely enclose the area through which the ink droplets pass on their way to the record receiving paper (not shown) or, if they are charged, to the shutter disc 14. This significant property of the new system prevents the collection of liquid droplets on the insulating means (not shown) which keep the electrodes 20 and 21 in position.

FIGS. 11 and 12 further illustrate that the new electrode system of this invention can also be used with an oscillating liquid jet 1. Such a liquid jet is especially suited for the recordation of alphanumerical and other markings, as is described in U.S. Pat. No. 3,737,914 or Swedish Pat. No. 347,375. The oscillating movement of the liquid jet 1 parallel with the surfaces of the electrodes 20 and 21 can be realized when the supply tube 2 is laterally oscillated, as is indicated in FIG. 11. Also other ways of providing such a movement of the liquid jet may be exploited. It is also, of course, within the scope of this invention to use a plurality of oscillating nozzles, such as shown in U.S. Pat. No. 3,737,914, with the electrode system of this invention.

It is obvious that the electrode systems shown in FIGS. 1–12 also permit the juxtaposition or superposition of a plurality of liquid jets and that these jets may perform an oscillating movement as stated above, if this should be desired. With such an arrangement, at least the high voltage electrode 21 may be common to all liquid jets.

It is, however, also possible to connect the signal voltage from the output amplifier 7 to the electrode 9 in the supply tube 2 and to connect the electrode 20 to ground, as pointed out above. In this case, the electrode 20 can be designed as an electrode common to all liquid jets. FIGS. 13 and 14 show an example of such a system. Here, the recording liquid is conducted in the supply tubes 2 a–d past the electrodes 9 a–d to the nozzles 3 a–d so that the liquid jets 1 a–d are formed and impinge upon the record receiving paper 24 which moves relative to the recording system. The electrode 22 is preferably put on ground potential while the electrode 23, as pointed out earlier, lies at 1,000 V to ground. As a consequence, an electric field will be formed between these electrodes, in which charged liquid droplets are deflected so as to impinge upon both shutter discs 14. The charge of the liquid droplets, however, is determined as previously pointed out by the signal voltage generated in the output amplifiers 7 a–d and is connected to the liquid in the supply tubes 3 a–d via the electrodes 9 a–d. In this way, the different liquid jets 1 a–d can be controlled independently of each other although the electrodes 22 and 23 are common to all jets. In this instance, it is naturally important that the electrodes 9 a–d are sufficiently insulated with respect to each other. This can be realized by separate liquid systems for each of the supply tubes 2 a–d or, alternatively, by giving these supply tubes a small diameter and sufficient length so that the liquid path will have a large electric resistance. This procedure has been earlier described in U.S. Pat. No. 3,737,914.

It is obvious that a number of liquid jets or a geometry of the electrode system other than that shown in FIGS. 13 and 14 can be also used. Furthermore, it is clear that the ink droplets which are caused to diverge from the axis of the jet stream by the deflection field of the droplet directing electrode must be removed immediately. In place of making electrode 22 and/or electrode 24 porous and using a vacuum system with them, it is possible to design these electrodes so that the entire electrode system can be positioned to make it possible to remove the ink by gravity.

The recording system illustrated in FIGS. 13 and 14 can be used, for example, for the recordation of alphanumerical markings of high quality on a rapidly travelling paper web. To this end, the recording system is disposed in such a way above the paper web that the longitudinal axis of the recording system makes a small angle with the direction of travel of the paper web. This is illustrated in FIG. 15 which shows a recording system 25 of eight liquid jets in superposed relation to the paper web which travels in the direction of the arrow. The liquid jets will provide on the paper web 24 a number of parallel record tracks which after suitable intensity modulation can form alphanumerical and other markings.

To print alphanumeric or other characters with this device, the signal sources 8 a–d must be controlled from a common control circuit usually containing a read only memory (ROM) defining the shape of the characters. Such control circuits are well known. Since the jets are spaced in the direction of the movement of the recording paper 24 as shown in FIG. 15, it may be practical to use suitable signal delaying circuits between the output of the ROM logic and each of the ink jets. To this end, shift registers of suitable length may be used, the shift frequency of which is controlled by a transducer measuring the speed of the recording paper 24. Alternatively, the information to be printed can be prepared by an electronic computer in such a way that the time delay between the different jets is taken into account. The control signals prepared in this way can be applied to the signal sources 8 a–d either directly from the computer or indirectly by using a magnetic tape as an intermediate medium. Even in this case, the print-out speed must be governed by a clock controlled by a transducer which measures recording paper speed. Such means are well known in the art.

It is also apparent from FIG. 15 that a plurality of recording systems 25 can be placed closely side by side. Such an arrangement of several parallel systems will allow the simultaneous printing of several parallel rows of columns of characters. This can also be achieved by using a single recording system 25 of such length that it covers several parallel rows or columns of characters.

It is obvious that the embodiments of the invention illustrated in FIGS. 1–15 have been cited only by way of example and that other embodiments can also be used. The requisite relative movement between the individual liquid jets and the record receiving paper can also be realized in other ways than those illustrated in these drawings. Finally, recording liquids other than ink, e.g., chemical reactants, and record receiving means of a material other than paper may be used.

It will thus be seen that the objects set forth above, among those made apparent from the preceding description, are efficiently attained and, since certain changes may be made in the above constructions without departing from the scope of the invention, it is intended that all matter contained in the above description as shown in the accompanying drawings should be interpreted as illustrative and not in a limiting sense.

I claim:

1. An ink-jet system including a source of liquid ink, means to form a jet stream of liquid ink droplets at a drop formation point, record receiving means, a signal control electrode to impress an electrical charge directly on said droplets at said drop formation point by applying an electrical signal voltage between said ink in said means to form said ink droplets and said signal control electrode, and droplet directing electrode means to control the direction of travel and ultimate disposition of said droplets, characterized in that said signal control electrode forms part of said droplet directing electrode means while remaining distinct therefrom in function.

2. An ink-jet system in accordance with claim 1 further characterized by including droplet cut-off means presenting a razor-sharp edge inclined toward the axis of said jet stream and toward said drop formation point for preventing droplets not travelling along the axis of said jet stream from reaching said record receiving means.

3. An ink-jet system in accordance with claim 2 wherein said droplet cut-off means is associated with said signal control electrode means.

4. An ink-jet system in accordance with claim 2 wherein said droplet cut-off means is associated with said droplet directing electrode means.

5. An ink-jet system in accordance with claim 2 including means to collect said droplets prevented from reaching said record medium by said droplet cut-off means.

6. An ink-jet system in accordance with claim 1 wherein said signal control electrode defines a field-free zone between said drop formation point and the field defined by said droplet directing electrode means.

7. An ink-jet system in accordance with claim 1 including means to periodically vary the direction of said liquid jet in a plane.

8. An ink-jet system in accordance with claim 1 wherein said signal control electrode is adapted for on-off modulation.

9. An ink-jet system in accordance with claim 1 wherein said signal control electrode is adapted to impress an electrical charge of varying intensity and polarity on said droplets.

10. An ink-jet system, comprising in combination
   a. a source of a liquid;
   b. means to form, at a drop formation point, a jet stream of droplets of said liquid having an initial stream axis;
   c. record receiving means for receiving said droplets;
   d. a signal source;
   e. a first electrode responsive to electrical signals from said signal source for impressing an electrical charge on said droplets subsequent to their formation;
   f. a second electrode, the surface of which is parallel to said initial stream axis and to at least a portion of the surface of said first electrode, said first and said second electrodes in combination being of a configuration to essentially completely enclose the path of said droplets; and
   g. voltage source means for maintaining between said first and second electrodes an electric field essentially transverse to said stream axis, whereby said electric field controls the direction of travel of said droplets and their ultimate disposition.

11. An ink-jet system in accordance with claim 10 wherein said signal source and said first electrode are adapted for on-off modulation, thereby to charge only preselected groups of four or more of said droplets, whereby said preselected groups of droplets are directed by said electric field to liquid collection means, the remainder of said droplets traveling along said axis to said recording receiving means.

12. An ink-jet system in accordance with claim 10 wherein said voltage source is isolated from ground and is connected between said first and second electrodes, whereby said signal source and said first electrode are adapted to impress an electrical charge of varying intensity and polarity on each of said droplets, and the ultimate position of each of said droplets on said record receiving means is determined by said electric field.

13. An ink-jet system in accordance with claim 10 including droplet cut-off means positioned between the end of said field and said record receiving means, said droplet cut-off means presenting a razor-sharp edge positioned just below said stream axis and inclined toward said drop formation point.

14. An ink-jet system in accordance with claim 10 including means associated with said droplet cut-off means for conducting and collecting droplets impinging on said droplet cut-off means.

15. An ink-jet system in accordance with claim 14 wherein said droplet cut-off means is attached to said first electrode.

16. An ink-jet system in accordance with claim 14 wherein said droplet cut-off means is attached to said second electrode.

17. An ink-jet system in accordance with claim 10 wherein at least said first electrode is formed of a porous electrically conducting material and said ink-jet system includes electrode housing means defining with said electrode means liquid channel means, and vacuum pump means for withdrawing liquid entering said channel means through said electrode.

18. An ink-jet system in accordance with claim 17 wherein both said first and said second electrodes are formed of said porous material and said electrode housing means are associated with both of said electrodes.

19. An ink-jet system in accordance with claim 10 wherein said first and second electrodes form an electrode system positioned to permit the collection by gravity of all of said droplets not reaching said record receiving means.

20. An ink-jet system in accordance with claim 10 wherein said first electrode causes a field-free zone to be formed between said drop formation point and said electric field between said first and second electrodes.

21. An ink-jet system in accordance with claim 20 wherein said first electrode is of tubular configuration defining a cylindrical volume and having an end closure with an aperture therethrough defining said field-free zone, and said second electrode is a wire extending into said cylindrical volume.

22. An ink-jet system in accordance with claim 20 wherein said first electrode is configured as three planar members defining a volume of rectangular cross section and having an end closure member with an aperture therethrough defining said first field-free zone, and said second electrode is configured as a rectangular block located within said volume.

23. An ink-jet system in accordance with claim 20 wherein said first electrode comprises a rectangularly configured block section and an enlarged section having an aperture defining said field-free zone, and said second electrode is configured as three planar members defining an open-ended volume of rectangular cross section, said block section of said first electrode being positioned within said open-ended volume.

24. An ink-jet system in accordance with claim 23 including an apertured electrically conductive porous wall terminating said rectangular block section of said first electrode.

25. An ink-jet system in accordance with claim 10 wherein said source of said liquid includes nozzle means terminating an ink supply tube and ink filter means in said ink supply tube.

26. An ink-jet system in accordance with claim 25 including means to mechanically oscillate said nozzle in a plane.

27. An ink-jet system, comprising in combination
  a. a plurality of liquid source means;
  b. droplet formation means associated with each of said liquid source means to form, at drop formation points, a plurality of jet streams of said droplets, each of said jet streams having a separate axis;
  c. record receiving means for receiving droplets from said streams;
  d. signal source means connected to said droplet formation means for impressing electrical charges on said droplets in said streams;
  e. first electrode means defining a plurality of field-free zones in proximity to said drop formation points
  f. second electrode means;
  g. voltage source means for maintaining between said first and said second electrode means at least one electrical field essentially transverse to the axes of said jet streams, whereby said field controls the direction of travel and the ultimate disposition of said droplets in said plurality of streams.

28. An ink-jet system in accordance with claim 27 wherein said first electrode means comprises a single electrode structure common to all of said jet streams.

29. An ink-jet system in accordance with claim 27 wherein said second electrode means comprises a single electrode structure common to all of said jet streams.

30. An ink-jet system in accordance with claim 27 including sharp-edged droplet cut-off means adapted to prevent those of said droplets diverted from said stream axis from reaching said record receiving means.

31. An ink-jet system in accordance with claim 27 wherein at least said first electrode means is formed of porous electrically conducting material and said ink-jet systems includes electrode housing means defining with said electrode means liquid channel means, and vacuum pump means for withdrawing liquid entering said channel means through said electrode means.

32. An ink-jet system in accordance with claim 27 wherein each of said source means comprises nozzle means terminating an ink supply tube and ink filter means in said ink supply tube.

33. An ink-jet system in accordance with claim 32 including means to mechanically oscillate each of said nozzles in a plane.

34. An ink-jet system in accordance with claim 27 wherein said first and second electrode means form an electrode system positioned to permit the collection by gravity of all of said droplets not reaching said record receiving means.

35. An ink-jet system, comprising in combination
  a. a source of a liquid ink including nozzle means terminating an ink reservoir;
  b. means to form, at a drop formation point, a jet stream of droplets of said liquid ink having an initial stream axis;
  c. record receiving means for receiving said droplets;
  d. a signal source;
  e. a first electrode responsive to electrical signals from said signal source for impressing an electrical charge on said droplets subsequent to their formation;
  f. a second electrode, the surface of which is parallel to said initial stream axis and to at least a portion of the surface of said first electrode, said first and second electrodes in combination being of a configuration to essentially completely enclose the path of said droplets;
  g. droplet cut-off means presenting a razor-sharp edge positioned just below said stream axis and inclined toward said drop formation point;
  h. voltage source means for maintaining between said first and second electrodes an electric field essentially transverse to said stream axis, whereby said electric field controls the direction of travel of said droplets and their ultimate disposition; and
  i. a field-free zone between said drop formation point and said electric field.

36. An ink-jet system in accordance with claim 35 including means to mechanically oscillate said nozzle means.

37. An ink-jet system in accordance with claim 35 wherein said first electrode is of tubular configuration defining a cylindrical volume and having an end closure with an aperture therethrough defining said field-free zone, and said second electrode is a wire extending into said cylindrical volume.

38. An ink-jet system in accordance with claim 35 wherein said first electrode is configured as three planar members defining a volume of rectangular cross section and having an end closure member with an aperture therethrough defining said field-free zone, and said second electrode is configured as a rectangular block located within said volume.

39. An ink-jet system in accordance with claim 35 wherein said first electrode comprises a rectangularly configured block section and an enlarged section having an aperture defining said field-free zone, and said second electrode is configured as three planar members defining an open-ended volume of rectangular cross section, said block section of said first electrode being positioned within said open-ended volume.

40. An ink-jet system in accordance with claim 39 including an apertured electrically conductive porous wall terminating said rectangular block section of said first electrode.

* * * * *